United States Patent [19]

Fourquier et al.

[11] Patent Number: 4,963,617
[45] Date of Patent: Oct. 16, 1990

[54] LOW TEMPERATURE SELF-CROSSLINKABLE POLYMER COMPOSITIONS AND PROCESSES

[75] Inventors: Dominique Fourquier, La Croix St. Oven; Jean Perronin, Senlis, both of France

[73] Assignee: Societe Chimique des Charbonnages S.A., Paris, France

[21] Appl. No.: 122,802

[22] Filed: Nov. 16, 1987

[30] Foreign Application Priority Data

Nov. 14, 1986 [FR] France ............................. 86/15842

[51] Int. Cl.$^5$ ............................................. C08L 27/12
[52] U.S. Cl. .................................... 524/805; 524/808; 524/809; 524/811
[58] Field of Search ................ 524/811, 805, 808, 809

[56] References Cited

U.S. PATENT DOCUMENTS

| | | |
|---|---|---|
| 2,604,463 | 7/1952 | Bilton et al. |
| 2,857,354 | 10/1958 | Fang |
| 3,058,947 | 10/1962 | Fryling et al. |
| 3,336,149 | 8/1967 | Fox et al. ............................. 524/811 |
| 4,559,398 | 7/1984 | Tesch et al. |

FOREIGN PATENT DOCUMENTS

| | | |
|---|---|---|
| 0106635 | 4/1984 | European Pat. Off. |
| 0129394 | 12/1984 | European Pat. Off. |
| 0183213 | 6/1986 | European Pat. Off. |
| 1429758 | 9/1974 | United Kingdom |

*Primary Examiner*—Joseph L. Schofer
*Assistant Examiner*—J. M. Reddick
*Attorney, Agent, or Firm*—Millen, White, & Zelano

[57] ABSTRACT

The invention relates to a crosslinking process for self-crosslinking (meth)acrylic copolymers soluble in organic solvents and characterized in that:

a dispersion or solution having a solids content of between 30 and 80% by weight and a viscosity of between 5 and 5,000 poises and composed of one or more organic solvents and one or more (meth)acrylic copolymers is prepared, the said copolymers having been obtained by copolymerization, in an organic solvent medium, of:

10 to 40% by weight of glycidyl (meth)acrylate, 4 to 20% by weight of at least one monoethylenic monomer X having one or more carboxyl functional groups and 40 to 86% by weight of at least one ethylenic comonomer Y, the ratio of the number of epoxy functional groups in the monomers to the number of carboxyl functional groups in the monomers being between 0.5 and 3.0 and the weight average molecular mass of the said copolymers being between 1,000 and 80,000 the said dispersion or solution containing, if appropriate, one or more polymerization catalysts in the case where the sum of the epoxy functional groups and carboxyl functional groups of the monomers is of the order of 25 mol % (relative to the total number of moles of monomers) or lower and the ratio of the number of epoxy functional groups to the number of carboxyl functional groups is between 2 and 3, the said dispersion or solution is then applied and dried, and subjected to a heat treatment between 30° and 90° C.

The process according to the invention allows the preparation of moulded, impregnated, coated and printed articles, adhesives, binders, finishers, paints and varnishes.

9 Claims, No Drawings

LOW TEMPERATURE SELF-CROSSLINKABLE POLYMER COMPOSITIONS AND PROCESSES

The present invention relates to a crosslinking process for self-crosslinking (meth)acrylic copolymers and to the use of these copolymers for the preparation of moulded, impregneted, coated and printed articles, adhesives, binders, finishers, paints and varnishes.

Since the plastic materials are associated with metallic articles, especially in the case of automobile bodies, it is extremely desirable to have coating compositions available which crosslink at low temperatures and substantially at temperatures lower than the transition temperatures of these plastics.

Hitherto, all kinds of polymers and polycondensates in the form of solutions, dispersion or powders have been used in the field of thermosetting paints and coatings. By way of example, the alkyd resins, polyesters, acrylic resins, epoxide resins obtained, for example, by condensation of derivatives of bis-phenol or polyoxyalkylene glycol with epichlorohydrin, polyurethanes prepared from polyols and isocyanates, and polyamides may be mentioned.

Amongst these, the epoxide resins and especially epoxides of aromatics are known to be very sensitive to the action of light and weathering. The resins utilizing isocyanates, which are admittedly very toxic, raise application problems in turn.

Amongst the others, there has been particular interest in acrylic resins in the form of a dispersion and more generally in solution in organic solvents. When applied at high temperatures (generally between 130° C. and 200° C., in the course of approximately 30 minutes), they make it possible to obtain coatings provided not only with good mechanical characteristics but likewise good properties with respect to durability and resistance to weathering, water, solvents and chemical agents in general.

Thus, in French Patent No. 2,247,516, German Patent No. 3,148,051 and Belgian Patent No. 888,572, hydroxylated acrylic copolymers have been claimed in combination with micromolecular or macromolecular "crosslinking agents", such as aminoplasts, epoxide resins or phenoplasts. The crosslinking of these copolymers is effected in the presence of acid catalysts, such as paratoluenesulphonic acid or latent acid catalysts such as the "blocked catalysts" described in French Patent No. 2,533,575, which allow the preparation, by mixing, of coating compositions which can be stored for several days without becoming active. Unfortunately, the coatings which are thus obtained and are crosslinked at low temperatures, for example at 90° C. for 30 minutes, are relatively sensitive to prolonged action of water and are not suitable for the applications mentioned above.

To mitigate this disadvantage, acrylic copolymers prepared from glycidyl acrylate or methacrylate have been recommended. These copolymers are crosslinked by mixing with "crosslinking agents" such as: the dicarboxylic or polycarboxylic acids mentioned in U.S. Pat. No. 2,857,354 or French Patent No. 2,149,409, the dicarboxylic acid anhydrides quoted in Belgian Patent No. 819,623, the phenol/formaldehyde resins, polyamide resins or urea/formaldehyde resins indicated in U.S. Pat. No. 3,058,947 or the resins containing amine groups, amide groups, acid groups or thiol groups, as mentioned in European Patent No. 0,129,394. These cross-linkings are promoted in the presence of known catalysts in this mixture, such as tetraalkylammonium salts, imidazole derivatives, tertiary amines or carboxylic acid salts. These compositions, applied in thin layers to metallic substrates, lead, after heat treatment at a low temperature, to coatings, the water content of which is in fact relatively good. Unfortunately, since crosslinking is incomplete under these conditions, the solvent content is inadequate.

Moreover, U.S. Pat. No. 2,604,463 describes linear thermoplastic copolymers based on glycidyl (meth)acrylate, (meth)acrylic acid, styrene and methyl (meth)acrylate, which are self-crosslinking at 150° C. and in which the acid content and glycidyl ester content do not exceed 20% by weight of the total mass.

According to the present invention, (meth)acrylic copolymers which are "self-crosslinking" in the absence of the abovementioned crosslinking agents and which cross-link perfectly at relatively low temperatures between 30° and 90° C. and generally between 60° and 90° C., have now been found.

In particular, the invention relates to a cross-linking process for self-crosslinking (meth)acrylic copolymers soluble in organic solvents, which is characterized in that:

a dispersion or solution having a solids content of between 30 and 80% by weight and viscosity of between 5 and 5,000 poises and composed of one or more organic solvents and one or more (meth)acrylic copolymers is prepared, the said copolymers having been obtained by copolymerization, in an organic solvent medium, of:

10 to 40% by weight of glycidyl (meth)acrylate, 4 to 20% by weight of at least one monoethylenic monomer X having one or more carboxyl functional groups and 40 to 86% by weight of at least one ethylenic comonomer Y, the weight average molecular mass of the said copolymers being between 1,000 and 80,000 and the ratio of the number of epoxy functional groups in the monomers to the number of carboxyl functional groups in the monomers being between 0.5 and 3.0, the said dispersion or solution containing, if appropriate, one or more polymerization catalysts in the case where the sum of the epoxy functional groups and carboxyl functional groups of the monomers is of the order of 25 mol % (relative to the total number of moles of monomers) or lower and the ratio of the number of epoxy functional groups to the number of carboxyl functional groups is between 2 and 3, the said dispersion or solution is then applied and dried and subjected to a heat treatment at between 30° and 90° C.

Preferably, the copolymers according to the invention are obtained by copolymerization in an organic solvent medium from:

12 to 40% by weight of glycidyl (meth)acrylate, 5 to 16% by weight of at least one monoethylenic monomer X having one or more carboxyl functional groups, and 54 to 83% by weight of at least one ethylenic comonomer Y.

Preferably, the ratio of the number of epoxy functional groups to the number of carboxyl functional groups is between 1 and 2.

Preferably, the copolymers according to the invention also have a weight average molecular mass of between 10,000 and 50,000.

The copolymers according to the invention are colourless. They have a transition temperature of between 0° C. and 80° C., and generally between 20° C. and 50° C. Their acid number is generally between 30 and 120 (measured according to French standard NFT 30,402) and their epoxy equivalent is of the order of 0.8 to 2.8 equivalent/kg (measured according to French standard NFT No. 51,522).

As monoethylenic monomers X which have one or more carboxyl groups and are suitable for the invention, acrylic acid, methacrylic acid, 3,3-dimethylacrylic acid, 4-pentenoic acid, itaconic acid, crotonic acid, allylglycolic acid, 10-undecenoic acid, maleic acid, fumaric acid, acidic alkyl maleates, acidic alkyl fumarates, acidic alkyl itaconates and dicarboxymonoacryloyl isocyanurate may be mentioned as non-restrictive examples.

As ethylenic monomers Y which have one or more ethylenic bonds and are suitable for the invention, acrylic esters or methacrylic esters may be mentioned, such as methyl, ethyl, butyl, isobutyl, tertiolybutyl, hexyl, 2-ethylhexyl, lauryl, stearyl, cyclohexyl, benzyl, phenyl, norbornyl, methoxyethyl, ethyldiglycol, tert.butylcyclohexyl, the 8-phenyl-ethyl, tetrahydrofurfuryl, dihydrodicyclopentadienyl, dibromopropyl, 2-[2-N-methyl-N-(perfluorooctyl)-ethylsulphonyl]-aminoethyl, trifluoroethyl and 2-(perfluorohexyl)-ethyl acrylates and methacrylates, as well as acrylonitrile, methacrylonitrile and the chloride of 2-trimethylammoniumethyl acrylate. Further ethylenic monomers may also be mentioned, such as vinyl derivatives: vinyl acetate, vinyl propionate, vinyl isobutyrate, vinyl senecioate, vinyl laurate, vinyl octanoate, vinyl 2-ethylhexanoate, vinyl methyl ether, vinyl ethyl ether, vinyl isobutyl ether, vinyl octadecyl ether, vinyl chloride, vinylidene chloride and the vinyl esters of the acids known commercially under the name versatic acids. Halogenated or non-halogenated hydrocarbons such as ethylene, propylene, isobutylene, styrene, α-methyl styrene, vinyltoluene and α-cyanomethylstyrene may also be used. Finally, a quantity of less than 2% by weight of monomers Y containing several ethylenic functions can be used, such as allyl methacrylate, ethylene glycol dimethacrylate, butane-1,4-diol dimethacrylate, trimethylolpropane trimethacrylate, hexanediol diacrylate, pentaerythritol tetraacrylate, butadiene, chlorobutadiene, divinylbenzene and triallyl isocyanurate.

Moreover, as the comonomers Y having one or more ethylenic bonds, monomers containing functional groups may also be employed, such as hydroxyalkyl acrylates and methacrylates, such as ethylene glycol monoacrylate, propylene glycol monomethacrylate and butanediol monoacrylate allyloxyethanol, allyl alcohol, N-(hydroxymethyl)-acrylamide, allylamine, dimethylaminoethyl acrylate and methacrylate, diethylaminoethyl acrylate, dimethylaminopentyl acrylate, vinylpyridine, vinylimidazole, 1-vinyl-2-methylimidazole, vinylcarbazole, vinylcaprolactam, vinylpyrrolidone, acrylamide and methacrylamide, N-(isobutoxymethyl)-acrylamide, N-isopropylacrylamide, methylacrylamidoglycollate methyl ether, maleic anhydride, citraconic anhydride, vinylsulphonic acid, styrene-para-sulphonic acid and acrolein.

The copolymers according to the invention are obtained by the known solution copolymerization process.

The copolymerization reaction can be initiated by anionic or cationic catalysts or by catalysts or radiation capable of producing free radicals. The copolymerization can be carried out in a continuous, discontinuous, incremental or programmed manner, at varying temperatures between, for example, 40° C. and 160' C., depending on the monomers and catalysts employed. Preferably, the free-radical route is used in the present invention.

Under these conditions, peroxygenated compounds such as benzoyl peroxide, lauroyl peroxide, bis-(4-tert.butylcyclohexyl) peroxydicarbonate, tertiarybutyl perdecanoate, t.-butyl perbenzoate, tertiarybutyl perpivalate, methyl ethyl ketone peroxide, tertiarybutyl hydroperoxide, tertiarybutyl peroxide, peracetic acid or amine oxides are used for initiating the copolymerization reaction. Azo compounds such as 2,2'-azo-bis-isobutyronitrile, 4,4'-azo-bis-(4-cyano-pentanoic acid), 2,2'-azo-bis-(2,4-dimethylvaleronitrile) or redox systems such as the lauroyl peroxide/acetylacetone or 2,3-butanedione pair, the tertiarybutyl perpivalate/cobalt octoate pair and the benzoyl peroxide/dimethylparatoluedine pair are also used as initiators. The quantities of catalyst used can vary within wide limits, for example between 0.5 and 8% by weight relative to the monomers to be copolymerized, preferably between 2 and 5%.

For regulating the molecular weight of the copolymers according to the invention and the viscosity of their solution, transfer agents known to those skilled in the art are used during their preparation, such as the alkylmercaptans such as tertiary dodecylmercaptan, N-dodecylmercaptan and thioglycollic acid, or such as carbon tetrachloride, carbon tetrabromide and triphenylmethane. The quantities to be used are a function of the molecular weight to be obtained and can reach up to 5% by weight relative to the monomers and preferably vary between 0.1 and 1%.

The copolymerization is effected in solution, using one or more solvents in which the copolymer is soluble. Thus, solvents such as toluene, xylene, methyl ethyl ketone, ethylglycol acetate, isopropanol, butanol, trichloroethane, methylisobutylcarbinol, butyl acetate, methylglycol and ethylglycol, dibutyl ether, methylcyclohexane, 2-nitropropane, heptane, white spirit or cumeme, individually or as a mixture, are used.

Advantageously, the solutions or dispersions according to the invention also contain one or more cross-linking catalysts which further improve their reactivity and, as a result, allow the temperature and the duration of the heat treatment during the crosslinking of these solutions or dispersions to be reduced at the same time. In fact, it has been found that the use of a polymerization catalyst is indispensable when the copolymer or copolymers according to the invention are such that the sum of the epoxy functional groups of the monomers and of the carboxyl functional groups of the monomers used for preparing the said copolymer(s) is of the order of 25 mol % (relative to the total number of moles of monomers) or lower and the ratio of the number of epoxy functional groups to the number of carboxyl functional groups is between 2 and 3. In this case, whatever the operating conditions used for the heat treatment (especially temperature and duration of the treatment), the characteristics of the final coating prepared from a solution or dispersion according to the invention are in fact moderate and even mediocre, if the said solution or dispersion does not contain a polymerization catalyst.

By contrast, in the case where the copolymer used is such that the sum of the epoxy functional groups of the monomers and the carboxyl functional groups of the monomers is greater than 25 mol % (relative to the total number of moles of monomers) and the ratio of the number of epoxy functional groups to the number of carboxyl functional groups is below 2, the use of a polymerization catalyst is then not indispensable for obtaining a coating having excellent properties. Of the order of 0.1 to 10% by weight of polymerization catalyst relative to the quantity of the self-crosslinking (meth)acrylic copolymer(s) is used.

Crosslinking catalysts suitable for the preparation of the solutions and dispersions according to the invention and promoting the crosslinking of the copolymers according to the invention are, for example, tetraalkylphosphonium salts, imidazole derivatives, tertiary amines, boron derivatives or carboxylic acid salts. The following may be mentioned by way of example: tetrabutylphosphonium acetate, tetraphenylphosphonium bromide, 4-(hydroxymethyl)-imidazole chloride, imidazole or glyoxaline, 2-methylimidazole, 1-methylimidazole, 4-methyl-imidazole, 2,4-dimethylimidazole, 2-ethyl-4-methylimidazole, 2-undecylimidazole, 2-phenyl-4-methylimidazole, 1-benzyl-2-methylimidazole, 1-cyanoethyl-2-phenylimidazole trimellitate, 2,4-diamino-2-(2'-ethyl-4'-methylimidazo-1'-yl)-ethyl-s-triazine, 1-cyanoethyl-2-phenyl-4,5-di-(cyanoethoxymethyl)-imidazole, 2-[N-(benzylanilino)-methyl]-2-imidazoline phosphate, 2-benzyl-2-imidazoline hydrochloride, benzimidazole, mercaptobenzimidazole, 2-mercaptothiazoline, piperazine, N-methylmorpholine, N,N'-diethylcyclohexylamine, N,N-dimethylbenzylamine, dicyandiamide, triphenylphosphine, boron trifluoride, the $BF_3$/monomethylamine or monoethylamine, $BF_3$/2-methylimidazole and $BF_3$/phenol complexes, triethylenediamine, stannic chloride, aluminium chloride, triphenyltin chloride, dibutyl-tin dilaurate, uranyl nitrate, aluminium acetylacetonate and cobalt naphthenate. Products such as 1-vinylimidazole, 1-vinyl-2-methylimidazole and their polymers or copolymers can also be used. It is likewise possible to use blocked catalysts such as the 2-methylimidazole/pyromellitic acid or isocyanuric acid complexes, substituted ureas such as those described in European patent No. 0,108,712, ketimines or aldimines such as N,N'-dicinnamylidene-1,6-hexanediamine, the compounds described in French patent No. 2,544,723, hydrazides such as those mentioned in European patent No. 106,635, imidazoles such as those mentioned in European patent No. 0,124,482 and German patent No. 3,327,827, or even amine oxides.

Preferably, solutions or dispersions of self-cross-linking (meth)acrylic copolymers are used, the solids content of which is high and is between 50 and 60% by weight.

Preferably, the solutions or dispersions according to the invention also have a viscosity of between 10 and 500 poises, expressed at 60% solids content.

The organic solvents suitable for preparing the solutions and dispersions according to the invention are, for example, those used for the solution copolymerization and mentioned above.

In addition, the solutions or dispersions according to the invention can contain various adjuvants such as colloids, thickeners, surfactants, dispersants, antioxidants, UV absorbers, stabilizers, corrosion inhibitors, grinding aids, siccatives, anti-skinning agents, antistatic agents, anticratering agents, plasticizers, lubricants, antifoaming agents, water repellents, oil repellents, natural or synthetic waxes and fungicides.

Similarly, these solutions or dispersions may additionally contain, if appropriate, other copolymers such as condensates and natural or synthetic resins or binders, which are different from the copolymers according to the invention. By way of example, vinyl or acrylic copolymers, alkyd resins, polyester resins, polyamides, cellulose derivatives such as cellulose acetates cellulose aceto-butyrates, carboxycelluloses or alkylcelluloses, nitrocellulose, or natural gums such as schellac and colophony derivatives may be mentioned.

These solutions or dispersions can also contain organic or mineral fillers such as calcium carbonate, silica, glass particles, glass fibres or carbon fibres, talc, kaolin, alumina and the like.

Finally, these solutions or dispersions can also contain mineral or organic, soluble or dispersed pigments or colorants. By way of non-restrictive examples, titanium dioxide, lithopone, barium sulphate, calcium sulphate, basic lead silicate, zinc chromate, zinc oxide, iron oxides, lead chromate, ultramarine blue, green chromium oxide, molybdenum red and carbon black may be mentioned as mineral pigments. Still by way of non-restrictive examples, the colorants belonging to the most diverse classes such as azo compounds, azomethines, anthraquinones, phthalocyanines and indigoids may be mentioned as organic pigments. Pigment indanthrone (Colour Index No. 69,800), "CI Pigment Yellow 16" (No. 20,040), "CI Pigment Green 7" (No. 74,260), "CI Pigment Yellow 14" (No. 21,095), the disazo pigment obtained by coupling the tetrazo derivative of one mole of 4,4'-diamino-3,3'-dichloro-diphenyl with 2 moles of N-acetoacetyl-p-chloroaniline, chlorinated copper phthalocyanine green and copper $\alpha$- and $\beta$-phthalocyanine blues may be mentioned as such pigments. Metal flakes such as aluminium flakes can be used for the same purpose.

The solutions or dispersions according to the invention can contain, essentially as a mixture "in one and the same pot", one or more copolymers in solution, as characterized above, and if appropriate one or more cross-linking catalysts. These compositions are then applied to a substrate, and they are sufficiently stable to be stored for several days at ambient temperature, in general from 1 to 5 days.

The solutions or dispersions according to the invention can be applied by conventional techniques such as spraying, gun-spraying, coating, printing, brushing, roller-coating, curtain-coating or pouring.

After application and drying, these undergo a heat treatment for several minutes, generally 10 to 120 minutes, at the relatively low temperatures defined above, namely temperatures between 30° C. and 90° C. and generally between 60° C. and 90° C.

It is also possible to effect the coatings by simultaneously applying one part consisting of the solution or dispersion according to the invention and another part consisting of the crosslinking catalyst. In practical terms, this can be done by spraying with a gun, simultaneously fed from two reservoirs.

The solutions or dispersions according to the invention can be applied to diverse substrates such as metal, wood, glass, plastics and the like. In particular, they can be applied to metallic substrates such as steel or aluminium, with or without an undercoat such as primers based on zinc phosphate or resins deposited by electrophoresis.

The coatings applied from solutions or dispersions according to the invention are, after drying if appropriate, crosslinkable at temperatures between 30° C. and 90° C. and generally between 60° C. and 90° C., and they show good behaviour towards water and solvents. In addition, they have good general properties.

The examples which follow, wherein the parts indicated are by weight and the temperatures are in degrees centigrade, illustrate the invention without restricting it.

EXAMPLE 1

A reactor fitted with a heating device, reflux condensor, stirrer, a thermometer, a nitrogen inlet and a funnel for introducing reactants is charged with 393 parts of ethylglycol acetate and heated to 78° C. under a nitrogen atmosphere.

A mixture of 123.7 parts of glycidyl methacrylate, 35.4 parts of methacrylic acid, 218.1 parts of butyl acrylate and 212.1 parts of methyl methacrylate is prepared separately, and 17.7 parts of bis-4-tert.butyl--cyclohexyl peroxydicarbonate are dissolved in the mixture while maintaining the latter at a temperature below 15° C.

The mixture of the monomers and of the catalyst is introduced in the course of two hours by means of the funnel into the reactor which is maintained at a temperature of 78°±1° C.

After the addition of the monomers, the temperature of 78° C. is maintained for a supplementary period of 1 hour before final cooling.

The resin thus obtained shows a solids content of 59.2% (measured by baking 0.5 part of resin for one hour at 150° C.) corresponding to a copolymerization yield of 97.6%, a viscosity of 625 poises at 20° C., a weight average molecular mass (designated Mw below) of 48,000 and a glass transition temperature (designated Tg below) of 20° C.

EXAMPLE 2

A reactor fitted with a heating device, a reflux condenser, a stirrer, a thermometer, a nitrogen inlet and a funnel for introducing reactants is charged with 390.8 parts of methyl isobutyl ketone and heated to 78° C. under a nitrogen atmosphere.

A mixture of 129.9 parts of glycidyl methacrylate, 49.4 parts of methacrylic acid, 34.5 parts of hydroxyethyl methacrylate, 177.0 parts of butyl acrylate and 183.9 parts of methyl methacrylate is prepared separately, and 20.1 parts of bis-4-tertiarybutylhexyl peroxydicarbonate are dissolved in the mixture maintained at a temperature below 15° C.

The mixture of the monomers and of the catalyst is introduced in the course of 45 minutes by means of the funnel into the reactor which is maintained at a temperature of 78°±1° C. After addition of the monomers, the temperature of 78°±1° C. is maintained for a complementary period of 45 minutes. During this period, a further addition of 2.9 parts of bis-4-tertiarybutylcyclohexyl peroxydicarbonate is made dropwise in the course of 15 minutes, 10 minutes after the end of the introduction of the reactants, in order to complete the copolymerization reaction of the monomers. The reaction mixture is then cooled.

The resin thus obtained has a solids content of 58.8% (measured by baking 0.5 part of resin for 1 hour at 150° C.) corresponding to a yield of 98.3%, a viscosity of 305 poises at 20° C., an Mw of 64,000 and a Tg of 28° C.

EXAMPLE 3

A reactor fitted with a heating device, a reflux condenser, a stirrer, a thermometer, a nitrogen inlet and a funnel for introducing reactants is charged with 376.2 parts of methyl isobutyl ketone and heated to 78° C. under a nitrogen atmosphere.

A mixture of 123.0 parts of glycidyl methacrylate, 35.1 parts of methacrylic acid, 216.8 parts of butyl acrylate and 210.9 parts of methyl methacrylate is prepared separately, and 20.5 parts of bis-4-tertiary-butylcyclohexyl peroxydicarbonate are dissolved in the mixture maintained at a temperature below 15° C.

The mixture of the monomers and of the catalyst is introduced in the course of 45 minutes by means of the funnel into the reactor maintained at a temperature of 78°±1° C. After addition of the monomers, the temperature of 78° C. is maintained for a complementary period of 45 minutes. During this period, a further addition of 2.9 parts of bis-4-tertiarybutylcyclohexyl peroxydicarbonate dissolved in 14.6 parts of methyl isobutyl ketone is made dropwise within 15 minutes, 10 minutes after the end of the introduction of the reactants, in order to complete the copolymerization reaction of the monomers. The reaction mixture is then cooled.

The resin thus obtained has a solids content of 59.5% (measured by baking 0.5 part of resin for one hour at 150° C.) corresponding to a copolymerization yield of 98.2%, a viscosity of 67 poises at 20° C., an Mw of 44,200 g and a Tg of 17° C.

EXAMPLE 4

A reactor fitted with a heating device, a reflux condenser, a stirrer, a thermometer, a nitrogen inlet and a funnel for introducing reactants is charged with 395.4 parts of ethylglycol acetate and heated to 80° C. under a nitrogen atmosphere.

A mixture of 82.6 parts of glycidyl methacrylate, 33.7 parts of methacrylic acid, 261.5 parts of butyl acrylate and 203.5 parts of methyl methacrylate is prepared separately, and 23.3 parts of bis-4-tertiarybutylcyclohexyl peroxydicarbonate are dissolved in the mixture maintained at a temperature below 15° C.

The mixture of the monomers and of the catalyst is introduced in the course of two hours by means of the funnel into the reactor which is maintained at a temperature of 80°±2 C. After the addition of the monomers, the temperature of 80° C. is maintained for a complementary period of 1 hour, before final cooling. The resin thus obtained has a solids content of 58.9% (measured by baking 0.5 part of resin for one hour at 150° C.) corresponding to a copolymerization yield of 97.2%, a viscosity of 78 poises at 20° C., an Mw of 34,600 and a Tg of 9° C.

EXAMPLE 5

A first composition according to the present invention is prepared by mixing 67.6 parts of the (meth)acrylic copolymer prepared in Example 1, 2.% parts of a 40% by weight solution of 2-methylimidazole in ethanol and 30.4 parts of ethylglycol acetate, a liquid mixture having a solids content of 40.8% and containing 2% (dry on dry) of 2-methylimidazole. This mixture has a storage stability of 2 days at ambient temperature, after which setting to a solid means is observed.

By means of a 150 μm Erichsen filmograph, about 1.5 parts of this first composition are deposited on a phosphated PARCOBOND 1041 metal plate of 85×185 mm from PARKER, and this is allowed to dry for 15 minutes at ambient temperature.

The crosslinking and the evaporation of the solvents is then accelerated by carrying out a heat treatment of the plate thus coated for 30 minutes in a ventilated oven at 90° C.

The coating thus obtained has the following properties, measured after leaving the film for 24 hours at ambient temperature after curing:

a thickness of 35 microns, a Persoz pendulum hardness of 270 seconds according to French standard NFT 30,016, 12 minutes resistance to soaking with xylene. This resistance is measured by the time, after which a piece of cotton wool thoroughly impregnated with xylene and helo on the film allows a skin of film to be scrapped off even superficially by means of a finger nail or a small stick of wood.

2 minutes resistance to soaking with acetone, measured by means of the identical method. not even a slight change in the gloss and appearance of the film after 500 hours immersion of the sample prepared above into a bath of distilled water maintained at 40° C.±1° C., according to French standard NFT 30,054.

For comparison, a second composition prepared according to the procedure described in this example but without addition of a crosslinking catalyst, that is to say 2-methylimidazole, was applied. The properties of the coating thus obtained under the same conditions are clearly inferior:

a Persoz hardness of 230 seconds, no resistance to soaking with xylene and acetone, swelling of the film after 50 hours immersion in water.

With such a copolymer and under such operating conditions, the presence of a crosslinking catalyst is indispensable.

EXAMPLE 6

A composition according to the present invention is prepared by mixing 67.2 parts of the acrylic copolymer prepared in Example 3, 1.2 parts of pure 1-methylimidazole corresponding to a content of 3% (dry on dry) and 31.6 parts of ethylglycol acetate. This mixture has a storage stability of 2 days at ambient temperature. All further details being the same in other respects, the procedure of Example 5 is repeated in order to obtain a crosslinked coating, the properties of which are as follows:

a Persoz hardness of 305 seconds, 6 minutes resistance to soaking with xylene, 45 seconds resistance to soaking with acetone, no change in the gloss or appearance of the film surface after 500 hours immersion in a water bath at 40° C.

EXAMPLE 7

A composition according to the present invention is prepared by mixing 67.9 parts of the acrylic copolymer prepared as in Example 4, 3.0 parts of the above 2-methylimidazole solution, corresponding to a content of 3% (dry on dry) and 29.1 parts of ethylglycol acetate.

This mixture has a storage stability of 3 days at ambient temperature. All further details being the same in other respects, the procedure of Example 5 is repeated in order to obtain a crosslinked coating, the properties of which are as follows:

a Persoz hardness of 230 seconds, 1.5 minutes resistance to soaking with xylene, 20 seconds resistance to soaking with acetone, no change in the gloss or appearance of the film surface after 500 hours immersion in a water bath at 40° C.

EXAMPLE 8

The procedure of Example 5 is repeated with the following modifications: a first composition according to the present invention of 68 parts of the acrylic copolymer described in Example 2, 5 parts of the above solution of 2-methylimidazole, corresponding to a content of 5% (dry on dry), and 27 parts of ethylglycol acetate is used, and a heat treatment is carried out for 30 minutes at 75° C.

The storage stability of this first composition is 1 day at ambient temperature.

All further details being the same in other respects, a crosslinked coating is obtained, the properties of which are:

a Persoz hardness of 260 seconds, 11 minutes resistance to soaking with xylene, 40 seconds resistance to soaking with acetone, no change in the appearance of the surface and the gloss of the film after 500 hours immersion in a water bath at 40° C.

For comparison, a second composition prepared by the procedure described in Example 8, but without addition of a crosslinking catalyst, that is to say 2-methylimidazole, is applied. The properties of the coating thus obtained under the same conditions are as follows:

a Persoz hardness of 150 seconds, 60 seconds resistance to soaking with xylene, no resistance to soaking with acetone, swelling of the film after 100 hours immersion in a water bath at 40° C.

With such a copolymer and such a heat treatment (75° C. for 30 minutes), the presence of a polymerization catalyst is indispensable.

EXAMPLE 9

A new composition is prepared, repeating the procedure of Example 8 with the following modifications:

omission of the 2-methylimidazole, heat treatment for 1 hour at 90° C.

All further details being the same in other respects, a crosslink coating is obtained, the properties of which are as follows:

a Persoz hardness of 305 seconds, 10 minutes resistance to soaking with xylene, no resistance to soaking with acetone, no change in the gloss or appearance of the film surface after 100 hours immersion in a water bath at 40° C.

Consequently, with such a copolymer and under such operating conditions, the presence of a crosslinking catalyst is not indispensable.

EXAMPLES 10 to 15

A certain number of compositions and coatings according to the present invention are prepared with the copolymer and according to the procedure described in Example 5, while making modifications to the nature and content of crosslinking catalyst and varying the heat treatment.

The table which follows shows that the coatings thus prepared are crosslinked.

| Example No. | Catalyst nature and content (in % by weight) | Pot life of the composition | Heat treatment conditions | Persoz hardness of the coating (French standard NFT 30,053) | Xylene soaking of the coating (in minutes) | Acetone soaking of the coating (in seconds) |
|---|---|---|---|---|---|---|
| 10 | 5% of piperazine | 12 h | ½ h-90° C. | 295 sec | 7 | 105 |
| 11 | 20% of hydrazide | >12 h | ½ h-90° C. | 200 sec | 10 | 100 |
| 12 | 5% of mercaptobenzimidazole | 1 D | ½ h-90° C. | 250 sec | 2 | 25 |
| 13 | 5% of BF$_3$/monoethylamine | 6 D | ½ h-110° C. | 220 sec | 1 | 15 |
| 14 | 5% of tetrabutylphosphonium acetate | >1 D | ½ h-90° C. | 270 sec | 7 | 100 |
| 15 | 5% of dimethylbenzylamine | >1 D | ½ h-90° C. | 300 sec | 5 | 45 |

We claim:

1. A process for self-crosslinking (meth)acrylic copolymers soluble in organic solvents, said process comprising:
providing a dispersion or solution having a solids content of between 30 and 80% by weight and a viscosity of between 5 and 5000 poises and composed of one or more organic solvents and one or more (meth) acrylic copolymers, said copolymers having been obtained by copolymerization, in an organic solvent medium, of
(a) 10 to 40% by weight of glycidyl (meth)acrylate
(b) 4 to 20% by weight of at least one monoethylenic monomer X having one or more carboxyl functional groups, and
(c) 40 to 86% by weight of at least one ethylenic comonomer Y with the proviso that monomer X and comonomer Y are different,
wherein
the sum of the epoxy functional groups and carboxyl functional groups of the monomers is about 25 mol %, relative to the total number of moles of monomers, or lower;
the ratio of the number of epoxy functional groups in the monomers to the number of carboxyl functional groups in the monomers being between 2 and 3; the weight average molecular mass of said copolymers is between 1000 and 80,000; and said dispersion contains at least one cross-linking catalyst;
the dispersion or solution is then applied and dried; and subjected to a heat treatment between 30° and 90° C.

2. Process according to claim 1, characterized in that the said copolymers are obtained by copolymerization, in an organic solvent medium, of:
12 to 40% by weight of glycidyl (meth)acrylate,
5 to 16% by weight of at least one monomer X having one or more carboxyl functional groups and
54 to 83% by weight of at least one ethylenic comonomer Y.

3. Process according to claim 1, characterized in that the weight average molecular mass of the copolymers is between 10,000 and 50,000.

4. Process according to claim 1, characterized in that the heat treatment is carried out between 60° and 90° C.

5. Process according to claim 1, characterized in that the heat treatment is applied for 10 to 120 minutes.

6. Process according to claim 1, characterized in that the solids content of the said dispersion or solution is between 50 and 60% by weight.

7. Process according to claim 1, characterized in that the viscosity of the dispersion or solution is between 10 and 500 poises, expressed at 60% by weight solids content.

8. A process acoording to claim 1, wherein monomer X is acrylic acid, methacrylic acid, 3,3-dimethylacrylic acid, 4-pentenoic acid, itaconic acid, crotonic acid, allylglycolic acid, 10-undecenoic acid, maleic acid, fumaric acid, acidic alkyl maleates, acidic alkyl fumarates, acidic alkyl itaconates or dicarboxymonoacryloyl isocyanurate;
monomer Y is methyl, ethyl, butyl, isobutyl, tertiolybutyl, hexyl, 2-ethylhexyl, lauryl, stearyl, cyclohexyl, benzyl, phenyl, norbornyl, methoxyethyl, ethyldiglycol, tert.butylcyclohexyl, the β-phenylethyl, tetrahydrofurfuryl, dihydrrodicyclopentadienyl, dibromopropyl, 2-aminoethyl, trifluoroethyl or 2-(perfluorohexyl)-ethyl acrylates or methacrylates, acrylonitrile, methacrylonitrile or the chloride of 2-trimethylammonium-ethylacrylate, vinyl acetate, vinyl propionate, vinyl isobutyrate, vinyl senecioate, vinyl laurate, vinyl octanoate, vinyl 2-ethylhexanoate, vinyl methyl ether, vinyl ethyl ether, vinyl isobutyl ether, vinyl octadecyl ether, vinyl chloride, vinylidene chloride or the vinyl esters of versatic acid; ethylene, propylene, isobutylene, styrene, α-methyl styrene, vinyltoluene or -cyanomethylstyrene; allyl methacrylate, ethylene glycol dimethacrylate, butane-1,4-diol dimethacrylate, timethylolpropane trimethacrylate, hexanediol diacrylate, pentaerythritol tetraacrylate butadiene, chlorobutadiene, divinylbenzene or triallyl isocyanurate; ethylene glycol monoacrylate, propylene glycol monomethacrylate or butanediol monoacrylate allyloxyethanol, allyl alcohol, N-(hydroxymethyl)-acrylamide, allylamine, dimethylaminoethyl acrylate and methacrylate, vinylpyridine vinylimidazole, 1-vinyl-2-methylimidazole, vinylcarbazole, vinylcaprolactam, vinylpyrrolidone, acrylamide or methacrylamide, N-(isobutoxymethyl)-acrylamide, N-isopropylacrylamide, methylacrylamidoglycollate methyl ether, maleic anhydride, citraconic anhydride, vinylsulphonic acid, styrene-parasulphonic acid or acrolein.

9. A process according to claim 1, wherein monomer X is methacrylic acid and comonomer Y is comprised of a mixture of butyl acrylate and methyl methacrylate.

* * * * *